United States Patent
Sakakima et al.

[11] Patent Number: 6,084,752
[45] Date of Patent: Jul. 4, 2000

[54] THIN FILM MAGNETIC HEAD

[75] Inventors: Hiroshi Sakakima, Tsuzuki-gun; Yousuke Irie, Kadoma; Yasuhiro Kawawake, Uji; Mitsuo Satomi, Katano, all of Japan

[73] Assignee: Matsushita Electric Industrial Co., Ltd., Osaka, Japan

[21] Appl. No.: 08/802,709

[22] Filed: Feb. 19, 1997

[30] Foreign Application Priority Data

Feb. 22, 1996 [JP] Japan .................................. 8-034557

[51] Int. Cl.[7] .................................................. G11B 5/39
[52] U.S. Cl. ............................................................ 360/113
[58] Field of Search ........................ 360/113; 338/32 R; 324/252

[56] References Cited

U.S. PATENT DOCUMENTS

| | | | |
|---|---|---|---|
| 4,881,143 | 11/1989 | Bhattacharyya et al. | 360/113 |
| 5,247,413 | 9/1993 | Shibata et al. | 360/113 |
| 5,311,385 | 5/1994 | Schwarz et al. | 360/113 |
| 5,312,644 | 5/1994 | Schwarz et al. | 427/130 |
| 5,390,061 | 2/1995 | Nakatani et al. | 360/113 |
| 5,435,053 | 7/1995 | Krounbi et al. | 29/603.25 |
| 5,446,613 | 8/1995 | Rottmayer | 360/113 |
| 5,648,885 | 7/1997 | Nishioka et al. | 360/113 |
| 5,712,612 | 1/1998 | Lee et al. | |
| 5,715,121 | 2/1998 | Sakakima et al. | |
| 5,726,837 | 3/1998 | Nakatani et al. | |
| 5,729,410 | 3/1998 | Fontana, Jr. et al. | |
| 5,764,567 | 6/1998 | Parkin | |
| 5,801,984 | 9/1998 | Parkin | |
| 5,898,547 | 4/1999 | Fontana, Jr. et al. | |
| 5,898,548 | 4/1999 | Dill et al. | |

FOREIGN PATENT DOCUMENTS

| | | |
|---|---|---|
| 0669607A2 | 8/1995 | European Pat. Off. |
| 0712117A2 | 5/1996 | European Pat. Off. |
| 0768643A2 | 4/1997 | European Pat. Off. |
| 0782129A2 | 7/1997 | European Pat. Off. |
| 5-225528 | 9/1993 | Japan |
| 7-240012 | 9/1995 | Japan |

OTHER PUBLICATIONS

M.A.M. Gijs et al., J. Appl. Phys., vol. 75 (10), 1994, pp. 6709–6713, "Perpendicular Giant Magnetoresistance of Microstructures in Fe/Cr and Co/Cu Multilayers (Invited)".

Robert Rottmayer, "A New Design For An Ultra–High Density Magnetic Recording Head Using A GMR Sensor In The CPP Mode", IEEE Transactions on Magnetics, vol. 31, No. 6 (Nov. 1995), pp. 2597–25 99.

European Search Report for European Application No. EP 97 10 2827.9 dated Jan. 9, 1998.

*Primary Examiner*—William Klimowicz
*Attorney, Agent, or Firm*—Renner, Otto, Boisselle & Sklar, LLP

[57] ABSTRACT

A thin film magnetic head includes an upper shield section, a lower shield section and a magnetoresistance device section between the upper shield section and the lower shield section. The magnetoresistance device section is connected to the upper shield section and the lower shield section through conductive layers. Current flows through the magnetoresistance device section via the upper shield and the lower shield.

33 Claims, 6 Drawing Sheets

THIN FILM MAGNETIC HEAD

BACKGROUND OF THE INVENTION

1. Field of the Invention

The present invention relates to a thin film magnetic head employing a magnetoresistance effect device (hereinafter, referred to as an MR device). In particular, the present invention relates to a thin film magnetic head for significantly high density magnetic recording having a remarkably narrow shield gap length.

2. Description of the Related Art

A thin film magnetic head employing an MR device have long been under development. FIG. 6 shows a cross-sectional view of a thin film magnetic head having a conventional MR device.

The conventional thin film magnetic head 200 includes a recording head section 180 and a reproducing head section 190. The recording head section 180 includes head cores 12 and 13 formed of magnetic substance, and a recording gap 14 formed of a non-magnetic insulating film. In addition, a winding conductor 11 is provided through the non-magnetic insulating film. In the recording head section 180, a magnetic field generated by current flowing through the winding conductor 11 is converged to the head cores 12 and 13, and thus recording is performed by the magnetic field leaked from the recording gap 14. This type of recording head section 180 is referred to as an inductive type recording head.

On the other hand, the reproducing head section 190 includes an upper shield 13 (functioning as the recording head core 13) and a lower shield 16 formed of magnetic films, and an MR device section 15 in a shield gap 17 between the upper and lower shields 13 and 16. The MR device section 15 is insulated from the upper shield 13 and the lower shield 16 by insulating films 18. A lead section 19 is formed so as to supply current in a direction of the plane of the thin film MR device section 15. Conventionally, as a material for the MR device section 15, a permalloy (e.g., $Ni_{0.6}Fe_{0.2}$) is used. The reproducing head section 190, which is a magnetoresistance effect type head, detects a change in a signal magnetic field from a medium as a change in the electric resistance of the MR device section 15, and this makes it possible for the head section 190 to read out a signal recorded in the medium.

However, the following problems arise in achieving high density recording when the conventional technique described above is used. Since a shield gap length (denoted by $d_{eg}$ in FIG. 6) is required to be equal to or shorter than the shortest signal wavelength to be reproduced, it is necessary to further reduce the thicknesses of the insulating films 18 and the MR device section 15 with further development of high density recording. In the future, the shield gap length is expected to be about 100 nm or less, and there will be a need for the thickness of the insulating film 18 to be about 50 nm or less. However, to the detriment of achieving high density recording, it is technically difficult to form an insulating film having a thickness of about 50 nm or less and maintain good insulating properties.

SUMMARY OF THE INVENTION

A thin film magnetic head according to the present invention includes an upper shield section, a lower shield section and a magnetoresistance device section. The magnetoresistance device section is between the upper shield section and the lower shield section. The magnetoresistance device section is connected to the upper shield section and the lower shield section through conductive layers. Current flows through the magnetoresistance device section via the upper shield and the lower shield.

In one embodiment of the invention, the magnetoresistance device section includes a multilayer structure exhibiting a giant magnetoresistance effect.

In another embodiment of the invention, the current flows in a direction substantially perpendicular to a plane of the multilayer structure.

In still another embodiment of the invention, the multilayer structure includes a soft magnetic film. The magnetization easy axis of the soft magnetic film is substantially orthogonal to a direction of the magnetic field to be detected.

In yet another embodiment of the invention, the multilayer structure includes a hard magnetic film, a soft magnetic film and a non-magnetic film formed between the hard magnetic film and the soft magnetic film. The magnetization easy axis of the hard magnetic film substantially agrees with a direction of a magnetic field to be detected.

In one embodiment of the invention, the thin film magnetic head further includes an interface magnetic film mainly composed of Co having a thickness of about 0.1 to 1 nm at least one of interfaces between the non-magnetic film and the hard magnetic film and between the non-magnetic film and the soft magnetic film.

In another embodiment of the invention, the magnetoresistance device section includes a plurality of multilayer structures.

In still another embodiment of the invention, the magnetoresistance device section includes a plurality of multilayer structures.

In yet another embodiment of the invention, the magnetoresistance device section further includes a non-magnetic film between the plurality of multilayer structures.

In one embodiment of the invention, the magnetoresistance device section further includes a non-magnetic film between the plurality of multilayer structures.

In another embodiment of the invention, the multilayer structure includes a metal anti-ferromagnetic film, a first magnetic film magnetically coupled to the metal anti-ferromagnetic film, a soft magnetic film and a non-magnetic film formed between the first magnetic film and the soft magnetic film in this order. The magnetization easy axis of the first magnetic film substantially agrees with a direction of a magnetic field to be detected.

In still another embodiment of the invention, the multilayer structure further includes an interface magnetic film mainly composed of Co having a thickness of about 0.1 to 1 nm at least one of interfaces between the non-magnetic film and the first magnetic film and between the non-magnetic film and the soft magnetic film.

In yet another embodiment of the invention, the magnetoresistance device section includes a plurality of multilayer structures.

In one embodiment of the invention, the magnetoresistance device section includes a plurality of multilayer structures.

In another embodiment of the invention, the magnetoresistance device section further includes a non-magnetic film between the plurality of multilayer structures.

In still another embodiment of the invention, the magnetoresistance device section further includes a non-magnetic film between the plurality of multilayer structures.

In yet another embodiment of the invention, the non-magnetic film includes a first non-magnetic film, a second non-magnetic film and a third non-magnetic film interposed between the first non-magnetic film and the second non-magnetic film. The second non-magnetic film has a thickness of about 0.1 to 1 nm and is formed of a different material from the first non-magnetic film and the second non-magnetic film.

In one embodiment of the invention, the non-magnetic film includes a first non-magnetic film, a second non-magnetic film and a third non-magnetic film interposed between the first non-magnetic film and the second non-magnetic film. The second non-magnetic film has a thickness of about 0.1 to 1 nm and is formed of a different material from the first non-magnetic film and the second non-magnetic film.

In another embodiment of the invention, the soft magnetic film is mainly composed of $Ni_X Co_Y Fe_Z$, where X is 0.6 to 0.9, Y is 0 to 0.4 and Z is 0 to 0.3 in an atomic composition ratio.

In still another embodiment of the invention, the soft magnetic film is mainly composed of $Ni_{X'} Co_{Y'} Fe_{Z'}$, where X' is 0 to 0.4, Y' is 0.2 to 0.95 and Z' is 0 to 0.5 in an atomic composition ratio.

In yet another embodiment of the invention, the soft magnetic film is formed of an amorphous material.

In one embodiment of the invention, the non-magnetic film is formed of any one of materials selected from Cu, Ag and Au.

In another embodiment of the invention, the non-magnetic film is formed of any one of materials selected from Cu, Ag and Au.

In still another embodiment of the invention, the first and second non-magnetic films are formed of Cu, and the third non-magnetic film is formed of Ag.

In yet another emboimdiment of the invention, the first and second non-magnetic films are formed of Cu, and the third non-magnetic film is formed of Ag.

In one embodiment of the invention, the non-magnetic film is an oxide thin film.

In another embodiment of the invention, the non-magnetic film is an oxide thin film.

In still another embodiment of the invention, the oxide thin film is formed of aluminum oxide.

In yet another emboimdnet of the invention, the oxide thin film is formed of aluminum oxide.

In one embodiment of the invention, the hard magnetic film is formed of a material mainly composed of Co.

In another embodiment of the invention, the ratio of remnant magnetization to a saturation magnetization of the hard magnetic film is about 0.7 or more.

In still another embodiment of the invention, the metal anti-ferromagnetic film is formed of any one of materials selected from NiMn, IrMn and PtMn.

In one embodiment of the invention, the multilayer structure includes a pair of magnetic films and a non-magnetic film interposed between the pair of magnetic films. The pair of magnetic films are a pair of soft magnetic films coupled in an anti-ferromagnetic exchange interaction.

In another embodiment of the invention, the magnetoresistance device section includes a plurality of multilayer structures.

In still another embodiment of the invention, the non-magnetic film is formed of any one of materials selected from Cu, Ag and Au.

According to the thin film magnetic head of the present invention, since the MR device section and the upper shield and the lower shield are connected to each other by conductive layers, the upper shield and the lower shield function as the lead section as well. The conductive layers can be easily made as thin as about 20 nm or less. Therefore, the thin film magnetic head of the present invention does not require very thin insulating films between the MR device section and the shields, thus eliminating the problems involved with minimizing gap in the insulating film and making the thickness of the MR device section very thin.

Furthermore, when the multilayer structure (artificial multilayers) exhibiting a giant magnetoresistance effect (GMR) is used in the MR device section, the multilayer structure exhibits a larger MR ratio in the case where the direction of sense current if perpendicular to the film plane than in the case where it is parallel to the plane direction (see, for example, J. Appl. Phys., 75(10), 15 May (1994) pp. 6709–6713). Therefore, a larger reproduction output can be obtained.

Thus, the invention described herein makes possible the advantage of providing a thin film magnetic head for very high density magnetic recording having a remarkably narrow shield gap length.

This and other advantages of the present invention will become apparent to those skilled in the art upon reading and understanding the following detailed description with reference to the accompanying figures.

DESCRIPTION OF THE PREFERRED EMBODIMENTS

Figure 1:
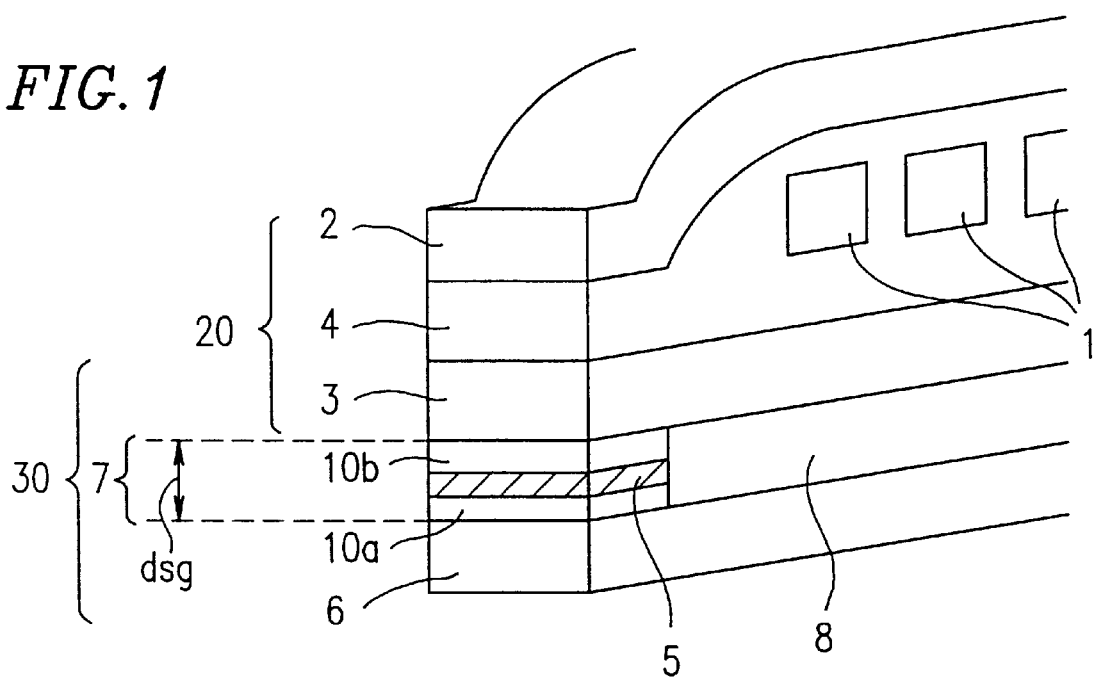
FIG. 1 is a cross-sectional view of a part of a thin film magnetic head according to the present invention.

FIG. 1 shows a cross-sectional view of a thin film magnetic head 100 according to the present invention. The thin film magnetic head 100 includes a recording head section 20 and a reproducing head section 30. The recording head section 20 includes an upper head core 2 and a lower head core 3 formed of a magnetic substances, and a recording gap 4 formed of a non-magnetic insulating film. In addition, a winding conductor 1 is provided through the non-magnetic insulating film forming the recording gap 4. In the recording head section 20, a magnetic field generated by current flowing through the winding conductor 1 is converged to the upper head core 2 and the lower head core 3, and thus recording to a medium is performed by the magnetic field leaked from the recording gap 4. This type of recording head is referred to as an inductive type recording head. The general structure of the recording head section 20 is the same as that of the conventional thin film magnetic head section 200 shown in FIG. 6.

The reproducing head section 30 includes an upper shield 3 (functioning as the lower head core 3 of the recording head section 20) and a lower shield 6 formed of magnetic films, and an MR device section 5 disposed in a shield gap 7 between the upper and lower shields 3 and 6. The structure of the reproducing head section 30 is different from that in the conventional thin film magnetic head.

The MR device section 5 in the shield gap 7 is interposed between the upper shield 3 and the lower shield 6 via conductive layers 10a and 10b. The upper shield 3 and the lower shield 6 function as a lead section for supplying sense current to the MR device section 5 as well. The upper and lower shield 3 and 6 are made of a metal material (e.g., Fe—Si—Al or the like) having an electric conductivity. An insulating film 8 is formed in a portion where the MR device section 5 is not disposed in the shield gap 7. In the thin film magnetic head 100 according to the present invention, sense current flows in a direction perpendicular to the plane of the thin film MR device section 5.

In the conventional thin film magnetic head 200, the MR device section 15 is interposed between the upper shield 13 and the lower shield 16 via the insulating films 18. On the other hand, in the thin film magnetic head 100 of the present invention, the MR device section 5 is interposed between the upper shield 3 and the lower shield 5 via the conductive layers 10a and 10b. Since it is possible to more easily make the conductive layers very thin than the insulating films, the conductive layer 10a and 10b can be formed to a thickness of about 20 nm or less. Therefore, according to the present invention, the problems associated with the abovementioned conventional techniques with respect to minimizing the gap of the insulating film and making the thickness of the MR device section very thin are overcome.

Furthermore, a permalloy (single layer) used as the magnetic material in the conventional MR device section does not exhibit a magnetoresistance effect, even if sense current flows in a direction perpendicular to the magnetic layer (in a direction of the thickness of the layer). Therefore, even if the structure of the present invention is applied to that case, the thin film magnetic head does not sufficiently function as such. It is preferable to employ artificial multilayers (multilayer structure) which exhibit a giant magnetoresistance effect (GMR) as the MR device section 5 in the thin film magnetic head of the present invention. This is because the artificial multilayers having a GMR exhibit a larger ratio of change in magnetoresistance (hereinafter, referred to as MR ratio) in the case where the sense current flows in the direction perpendicular to the film plane than in the case where it flows in a direction parallel to the film plane. The MR ratio is defined by the following equation:

MR ratio (%)=(R(maximum)=R(minimum))/R(minimum)×100

Next, an example of the MR device section having a multilayer structure suitably employed in the thin film magnetic head of the present invention will be described below.

Figure 2A:
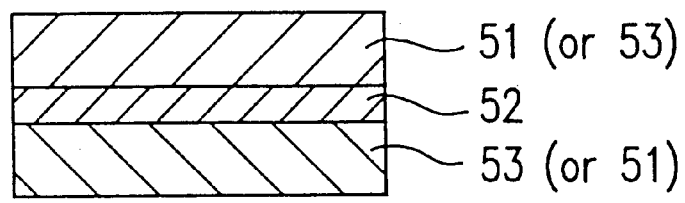
FIG. 2A is a cross-sectional view of an MR device section having a basic structure used in the magnetic head according to the present invention.

An MR device section (multilayer structure) 50 shown in FIG. 2A includes a hard magnetic film 51, a soft magnetic film 53 and a non-magnetic film 52 interposed between the hard magnetic film 51 and the soft magnetic film 53. The non-magnetic film 52 is formed in order to weaken magnetic coupling between the hard magnetic film 51 and the soft magnetic film 53. A material which has a good square feature of magnetization curve is preferable for the hard magnetic film 51, and preferably, the hard magnetic film 51 is formed in such a manner that the direction of the magnetic field (a signal magnetic filed of the medium or the like) to be detected is identical with the magnetization easy axis direction of the hard magnetic film 51. In the MR device section 50, only the magnetization direction of the soft magnetic film 53 is rotated (inverted) by the signal magnetic field, and the magnetization direction of the hard magnetic film 51 is not rotated. Thus, the electric resistance varies depending on the angle formed by the directions of the magnetization of the soft magnetic film 53 and the magnetization of the hard magnetic film 51. It is preferable that the magnetization easy axis of the soft magnetic film be substantially orthogonal to the direction of the magnetic field to be detected in order to obtain an output which provides good linearity and reduced noise.

In this specification, a magnetic film having a coercive force of 100 Oe or more is referred to as "a hard magnetic film", and a magnetic film having a coercive force of 20 Oe or less is referred to as "a soft magnetic film".

The operation principle of the MR device section 50 will be described below. In the case where the hard magnetic film 51 is unidirectionally magnetized by a ferromagnetic field, when a weak signal magnetic field having a direction opposite to the direction in which the hard magnetic film 51 is magnetized is applied to the MR device section 50, the magnetization of the hard magnetic film 51 is not rotated, but the magnetization of the soft magnetic film 53 is rotated to the direction of the signal magnetic field. As a result, the magnetization direction of the hard magnetic film 51 is anti-parallel to the magnetization direction of the soft magnetic film 53. When the magnetization direction of the hard magnetic film 51 is anti-parallel to that of the soft magnetic film 53, the electrons in a current flowing through the MR device section 50 is subjected to magnetic scattering, mainly at interfaces between the hard magnetic film 51 and the non-magnetic film 52, and between the non-magnetic film 52 and the soft magnetic film 53. As a result, the electric resistance of the MR device section 50 increases. On the other hand, when a weak signal magnetic field having the same direction as the direction in which the hard magnetic film 51 is applied to the MR device section 50, the magnetization direction of the hard magnetic film 51 is parallel to that of the soft magnetic film 53. As a result, the abovementioned magnetic scatting is reduced so that the electric resistance of the MR device section 50 is reduced. On the basis of the above-mentioned principle, the MR device section 50 varies its electric resistance depending on the change in the signal magnetic field. As described above, the change in the electric resistance is caused by magnetic scattering of electrons at the interfaces of the multilayer structure. Therefore, the change in the electric resistance becomes larger with respect to the current flowing in a direction perpendicular to the main plane of the MR device section 50. The main plane of the MR device section 50 refers a plane parallel to the plane defined by each layer constituting the multilayer structure and perpendicular to the stacked direction of the multilayer structure.

If necessary, a conductor line for a bias magnetic field for applying a bias magnetization to the above-mentioned MR device section 50 having the multilayer structure can be provided in the vicinity of the MR device section 50. Alternatively, in order to make at least the soft magnetic film 53 of the MR device section 50 into a single magnetic domain, an anti-ferromagnetic film or a hard magnetic film may be further attached to the end of the MR device section 50. This is true for the structures described later.

Figure 2B:
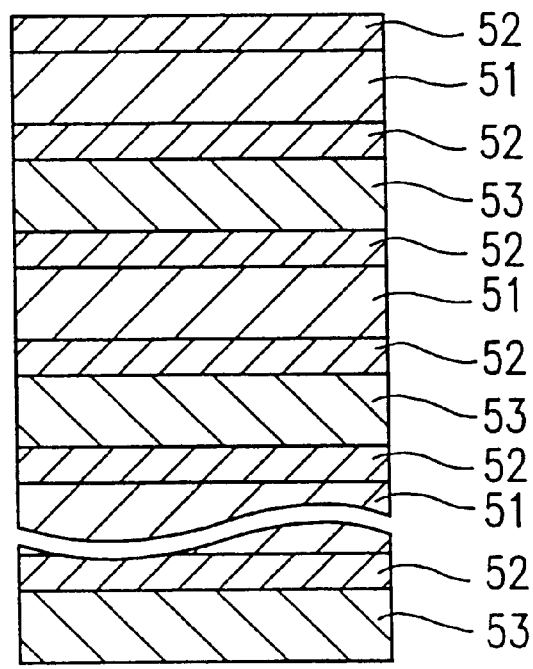
FIG. 2B is a cross-sectional view of a stacked type MR type section having a plurality of the structure shown in FIG. 2A.

FIG. 2B shows another structure of an MR device section preferably employed in the present invention. An MR device section 50' shown in FIG. 2B has a structure where a multilayer of [the hard magnetic film 51/the non-magnetic film 52/the soft magnetic film 53] shown in FIG. 2A is stacked a plurality of times via the non-magnetic film 52. Such a stacked structure is represented by [the hard magnetic film 51/the non-magnetic film 52/the soft magnetic film 53/the non-magnetic film 52]$^N$ (N indicates the number of repetitions). By adopting such a stacked structure, the magnetic scattering at the interfaces between the respective films increases. Therefore, in the case where there if room in the shield gap length, by employing the above-mentioned multilayer structure, an MR device having a larger MR ratio can be obtained.

Figure 3A:
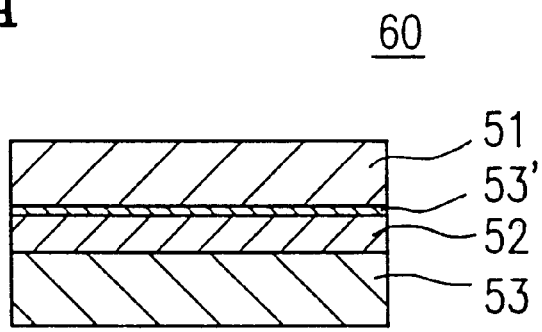
FIG. 3A is a cross-sectional view of another MR device section having a basic structure used in the magnetic head according to the present invention.

FIG. 3A shows an MR device section 60 in which, in the sandwich-type MR device section 50 shown in FIG. 2A, a magnetic film 53' (hereinafter, referred to as an interface magnetic film) is inserted at the interface between the hard magnetic film 51 and the non-magnetic film 52. However, it should be appreciated that the interface magnetic film 53' may be formed between the non-magnetic film 52 and the soft magnetic film 53. It is sufficient that the magnetic characteristics of the interface magnetic film 53' do not impair the magnetic characteristics of the magnetic film in contact with the interface magnetic film 53'. More specifically, in the case where the interface magnetic film 53' is inserted between the hard magnetic film 51 and the non-magnetic film 52, it is sufficient that the combination of the interface magnetic film 53' and the hard magnetic film 51 functions as a hard magnetic film. In the case where the interface magnetic film 53' is inserted between the soft magnetic film 53 and the non-magnetic film 52, it is sufficient that the combination of the interface magnetic film 53' and the soft magnetic film 53 functions as a soft magnetic film.

Figure 3B:
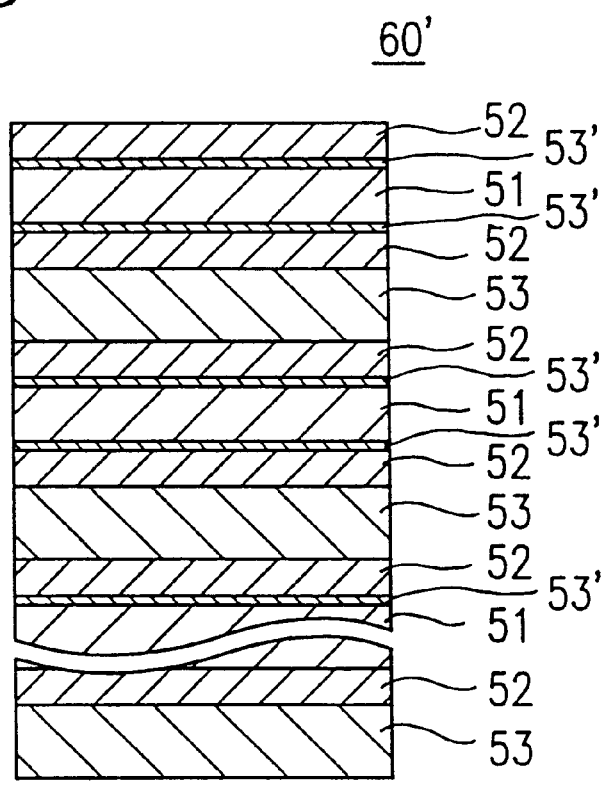
FIG. 3B is a cross-sectional view of a stacked type MR device section having a plurality of the structure shown in FIG. 3A.

FIG. 3B shows an MR device section 60' in which, in the stacked-type MR device section 50' shown in FIG. 2B, an interface magnetic film 53' is inserted between the hard magnetic film 51 and the non-magnetic film 52. In FIG. 3B, the interface magnetic film 53' is provided on both faces of the hard magnetic film 51, but it is also appreciated that the interface magnetic film 53' may be provided on only one face of the hard magnetic film 51. The MR device section 60' shown in FIG. 3B shows a larger MR ratio, as compared with the MR device section 60 shown in FIG. 3A.

In the case where the stacked-type MR device section shown in FIGS. 2B and 3B is used, it is preferable that the respective thicknesses of the hard magnetic film 51, the non-magnetic film 52, the soft magnetic film 53 and the interface magnetic film 53' are not very large in view of the means free path of electrons. More specifically, it is preferable that the respective thicknesses are about 6 nm or less. Furthermore, although the MR ratio increases with increasing the number of stacks of components, the effect is remarkably observed when the components are stacked three times or more. The effect is substantially saturated when the components are stacked ten times or more.

Figure 4A:
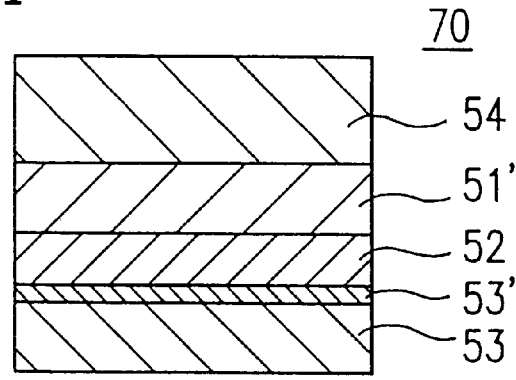
FIG. 4A is a cross-sectional view of still another MR device section having a basic structure used in the magnetic head according to the present invention.
Figure 4B:
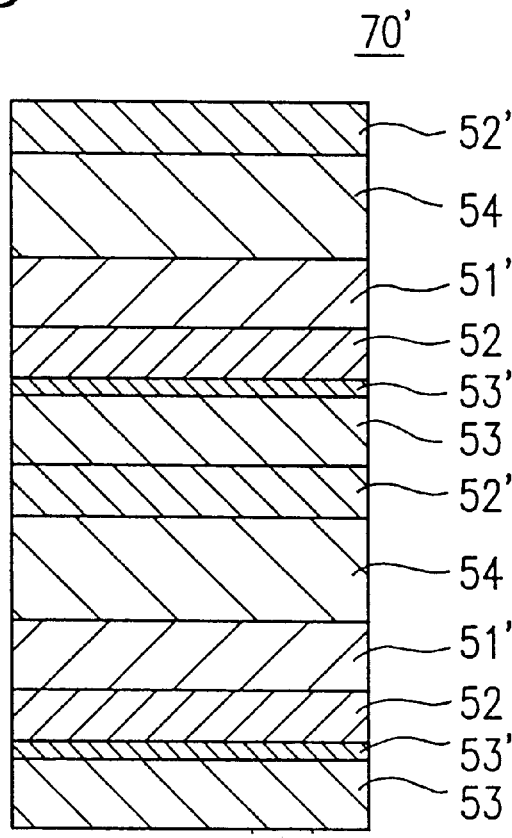
FIG. 4B is a cross-sectional view of a stacked type MR device section having a plurality of the structure shown in FIG. 4A.

FIGS. 4A and 4B show other examples of a multilayer structure using an anti-ferromagnetic film in another structure of the MR device section according to the present invention.

An MR device section (multilayer structure) 70 shown in FIG. 4A has a structure shown where a metal anti-ferromagnetic film 54, a magnetic film 51', a non-magnetic film 52, an interface magnetic film 53' and a soft magnetic film 53 are stacked in this order. The magnetic film 51' and the metal anti-ferromagnetic film 54 stacked thereon function in the same manner as the hard magnetic film 51 of the MR device section shown in FIGS. 2A and 3A. Alternatively, the interface a magnetic film 53' can be omitted. The non-magnetic film 52 interposed between the magnetic film 51' and the soft magnetic film 53 is formed in order to weaken magnetic coupling between the magnetic film 51' and the soft magnetic film 53. Furthermore, the interface magnetic film 53' improves magnetic scattering of electron spin at the interface, thus advantageously raising the MR ratio. The interface magnetic film 53' may be formed between the non-magnetic film 52 and the magnetic film 51', or may be formed on both faces of the non-magnetic film 52. A thickness of the interface magnetic film 53' is preferably about 0.1 to about 2 nm, and more preferably in the range of about 0.5 to about 1.5 nm, and the interface magnetic film 53' is preferably formed of a material mainly composed of Co (over 50 atomic % in the case of a binary system, and over 33.3 atomic % in the case of a ternary system).

In the MR device section 70, only the magnetization of the soft magnetic film 53 is rotated by the signal magnetic field, and the magnetization of the magnetic film 51' is not rotated. The electric resistance varies depending on the angle formed by the directions of the magnetization of the soft magnetic film 53 and the magnetization of the magnetic film 51'. The MR device section 70 is preferably formed in such a manner that the magnetization easy axis direction of the magnetic film 51' is identical with the direction of the signal magnetic field.

Furthermore, in the case where there is room in the shield gap length, as shown in FIG. 4B, when the structure unit shown in FIG. 4A is stacked a plurality of times to form the MR device section 70', a further larger MR ratio can be obtained.

In the above-mentioned MR device section, especially, when another non-magnetic film of 0.1 to 1 nm having an effect of weakening magnetic coupling between the magnetic films is further provided in the non-magnetic film, the magnetization of the soft magnetic film section is rotated more smoothly, resulting in an improvement of the magnetic field sensitivity of the MR device section. In this case, when Cu is used as a material for the non-magnetic film, and Ag as a material for the non-magnetic film, more significant effect can be obtained.

Furthermore, when the soft magnetic film is mainly composed of $Ni_XCo_YFe_Z$ (where X is 0.6 to 0.9, Y is 0 to 0.4 and Z is 0 to 0.3 in an atomic composition ratio), a MR device section having good sensitivity can be obtained. When the soft magnetic film is mainly composed of $Ni_{X'}Co_{Y'}Fe_{Z'}$ (where X' is 0 to 0.4, Y' is 0.2 to 0.95 and Z' is 0 to 0.5 in an atomic composition ratio), an MR device section which shows a relatively large MR ratio can be obtained. When an amorphous magnetic film such as Co—Mn—B, Co—Fe—B or the like is used as a material for the soft magnetic film, the obtained MR device section exhibits soft magnetism even if it has thin thickness, and exhibits the GMR characteristics.

It is preferable to use a metal material as a material for the non-magnetic film, and it is especially preferable to use any one of Cu, Ag and Au, because the obtained MR device section exhibits good GMR characteristics. The non-magnetic film may be formed of a tunnel GMR film made of a thin oxide thin film. In this case, since the electric resistance of the MR device section can be sufficiently enlarged with respect to the lead section, the MR device section can be made significantly thin. Thus, a thin film magnetic head having a very narrow shield gap can be easily formed. An oxide of Al ($Al_2O_3$) is desirable as a material for the oxide thin film. Furthermore, the non-magnetic film may be a film formed of a mixture of an oxide and a metal (e.g., a film where a column-like conductor exists as a conducting channel in the oxide).

When the hard magnetic film is mainly composed of Co (over 50 atomic % in the case of a binary system, and over 33.3 atomic % in the case of a ternary system), a large MR ratio can be obtained. It is preferable that the magnetization curve of the hard magnetic film preferably used in the present invention has a good square feature. In this specification, a "good square feature" is defined so that the square ratio S (=remnant magnetization/saturation magnetization) is 0.7 or more. When the square ratio S is smaller than 0.7, the MR curve in the vicinity of the zero magnetic filed deteriorates. The deterioration of the MR curve in the vicinity of the zero magnetic field causes the reproduction sensitivity and the linearity of the magnetoresistive type head. It is desirable that the square ratio of the hard magnetic film be 0.7 or more in order to obtain a MR device section having good linearity and a large MR ratio.

A metal material having conductivity is preferable as a material for the anti-ferromagnetic film. More specifically, NiMn, IrMn and PtMn can preferably be used. An oxide anti-ferromagnetic substance is not preferable, because it usually exhibits anti-ferromagnetism only when its thickness is 10 to 50 nm or more, and the electric resistance is high.

Figure 5A:
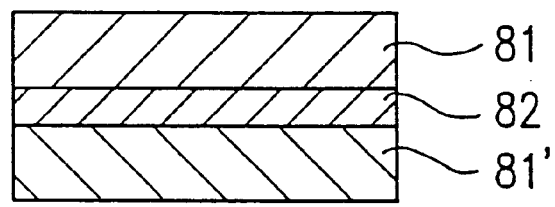
FIG. 5A is a cross-sectional view of still another MR device section having a basic structure used in the magnetic head according to the present invention.
Figure 5B:
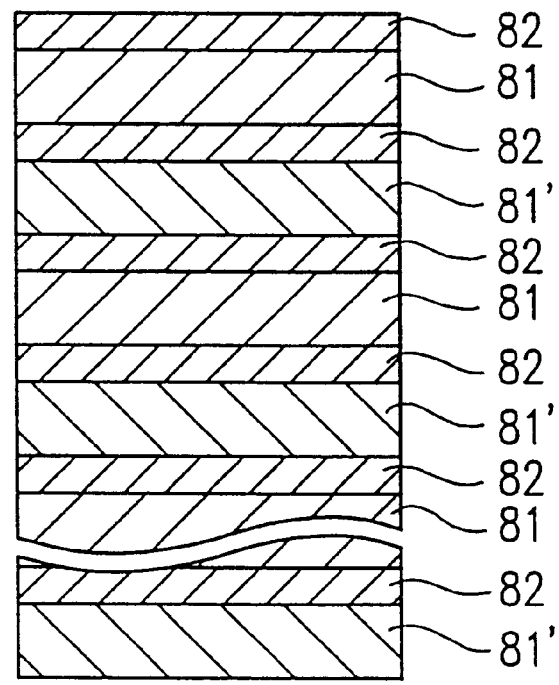
FIG. 5B is a cross-sectional view of a stacked type MR device section having a plurality of the structure shown in FIG. 5A.

As the structure of the MR device section, structures other than the above-mentioned structure can be used, such as MR device sections 80 and 80' shown in FIGS. 5A and 5B. The MR device section 80 includes two magnetic films 81 and 81' of the same type (i.e., two soft magnetic films or two hard magnetic films), which are coupled in an anti-ferromagnetic exchange interaction via a non-magnetic film 82 such as Cu, Ag, Au or the like. Alternatively, the MR device section 80' having a structure where the above-mentioned structure is stacked a plurality of times may be used. A large MR ratio can be obtained with this structure. However, the sensitivity is deteriorated to some extent with this structure. It is preferable that the two magnetic films 81 and 81' be soft magnetic films to reduce the degradation of the sensitivity.

The hard magnetic film and the soft magnetic film can be formed of the above-mentioned materials. In the case where the thickness of the non-magnetic film 82 is in the vicinity of 2 nm, the two magnetic films 81 and 81' are coupled in an anti-ferromagnetic exchange interaction. In such MR device sections 80 and 80', a large MR ratio can be obtained, but the sensitivity is less satisfactory than that of the MR device section described earlier. However, they can be applied to some uses.

EXAMPLES

Hereinafter, the present invention will be described by way of examples.

Example 1

In Example 1, a thin film magnetic head 100 (FIG. 1) having an MR device section 50' shown in FIG. 2B is fabricated as follows. First, a Fe—Si—Al film (having a thickness of about 2 $\mu$m) is formed on a substrate (e.g., a glass substrate) by sputtering to form a lower shield 6. A Cu film having a thickness of about 20 nm is formed thereon by patterning to form a conducive layer 10a. The MR device section 50' (having a thickness of about 60 nm) made of $[Co_{0.50}Fe_{0.50}(3 \text{ nm})/Cu(2 \text{ nm})/Ni_{0.68}Fe_{0.20}Co_{0.12}(13 \text{ nm})/Cu(2 \text{ nm})]^3$ is formed on the conductive layer 10a by sputtering. A Cu film having a thickness of about 20 nm is formed on the MR device section 50' by sputtering and patterned to form a conductive layer 10b. Thereafter, an $Si_3N_4$ film having a thickness of about 100 nm is formed as an insulating film by a reactive sputtering method. After throughholes are opened in the MR device section 50', a Fe—Si—Al (having a thickness of about 2 $\mu$m) is formed by sputtering to form an upper shield 3.

Thereafter, a non-magnetic insulating film 4 having a winding conductor 1 and a head core 2 are formed to complete the thin film magnetic head 100. The non-magnetic insulating film 4 and the head core 2 can be formed by a known material and a known production method. The obtained thin film magnetic head 100 having a narrow shied gap length (about 100 nm) provides a sufficient reproduction output.

Example 2

A thin film magnetic head of Example 2 is fabricated in the same manner as Example 1, except that the MR device section 50' is replaced by the MR device section 70 shown in FIG. 4A.

The MR device section 70 is Example 2 has a multilayer structure of $[Ir_{0.20}Mn_{0.80}(10 \text{ nm})/Co_{0.50}Fe_{0.50}(4 \text{ nm})/Al_2O_3(5 \text{ nm})/Co(0.8 \text{ nm})/Ni_{0.68}Fe_{0.20}Co_{0.12}(10.2 \text{ nm})]$ (a thickness of about 70 nm). As conductive layers 10a and 10b, Cu films having a thickness of about 15 nm are formed. The thin film magnetic head of Example 2 also provides sufficient reproduction output as in Example 1.

Example 3

A thin film magnetic head of Example 3 is fabricated in the same manner as Example 2, except that Ni—Fe—Co is used as the material for the lower shield 6, and the MR device section 70 is replaced by the MR device section 70 described below.

The MR device section 70 in Example 3 has a multilayer structure of $[Ir_{0.20}Mn_{0.80}(8 \text{ nm})/Co(3 \text{ nm})/Al_2O_3(5 \text{ nm})/Co_{0.90}Fe_{0.10}(1 \text{ nm})/CoMnB(2 \text{ nm})]$ (a thickness of about 19 nm). As conductive layers 10a and 10b, Cu films having a thickness of about 20 nm are formed. As an insulating film, an $Si_3N_4$ film having a thickness of about 60 nm is formed. The feature of this multilayer structure lies in that CoMnB which is amorphous is used as the material for the soft magnetic film. Although the tin film magnetic head of Example 3 has a narrow shield gap length of about 60 nm, it also provides a sufficient reproduction output as in Example 1.

Example 4

A thin film magnetic head of Example 4 is fabricated in the same manner as Example 1, except that the MR device section 50' in Example 1 is replaced by the MR device section 80' shown in FIG. 5B.

The MR device section 80' in Example 4 has a multilayer structure of $[Ni_{0.68}Co_{0.20}Fe_{0.12}(3\text{ nm})/Cu(2\text{ nm})/Co_{0.7}Fe_{0.20}Ni_{0.10}(3\text{ nm})/Cu(2\text{ nm})]^6$ (having a thickness of about 60 nm). Although the thin film magnetic head of Example 4 has slightly lower sensitivity, it also provides a sufficient reproduction output as in Example 1.

Comparative Example 1

Figure 6:
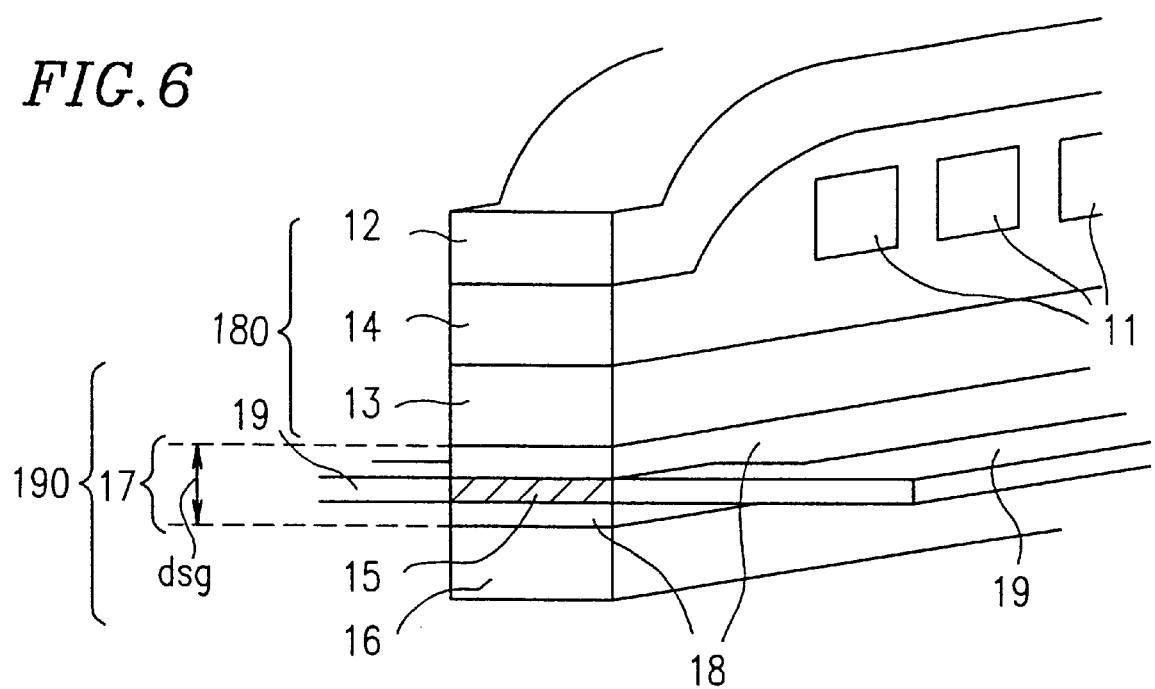
FIG. 6 is a cross-sectional view of conventional thin film magnetic head.

In Comparative Example 1, a conventional thin film magnetic head 200 shown in FIG. 6 is fabricated as follows. First, a Fe—Si—Al film (having a thickness of about 2 μm) is formed on a glass substrate by sputtering to form a lower shield 16. Next, an $Si_3N_4$ film having a thickness of about 40 nm is formed by a reactive sputtering method to form an insulating film 18 (in the lower portion). The MR device section 15 made of $[Co_{0.50}Fe_{0.50}(3\text{ nm})/Cu(2\text{ nm})/Ni_{0.68}Fe_{0.30}Co_{0.13}(13\text{ nm})/Cu(2\text{ nm})]$ is formed on the insulating film 18 (in the lower portion) by sputtering. An $Si_3N_4$ film having a thickness of about 40 nm is further formed thereon by sputtering to form an insulating film 18 (in the upper portion). A Fe—Si—Al (having a thickness of about 2 μm) is formed on the insulating film 18 by sputtering to form an upper shield 13.

Thereafter, the thin film magnetic head 200 is fabricated in the same manner as Example 1. Insulation is insufficient with the $Si_3N_4$ film having a thickness of about 40 nm. Moreover, in the thin film magnetic head 200 of Comparative Example 1, leakage occurs between the MR device section 15 and the shield section 13 and/or 16, thus resulting in an instable operation.

As described above, since the thin film magnetic head of the present invention does not require a very thin insulating film between the shield section and the MR device section, the problem of minimizing the gap of the insulating film in the conventional thin film magnetic head is eliminated, and a thin film magnetic head for very high density magnetic recording having a remarkable narrow shield gap length can be provided. Moreover, when a multilayer structure exhibiting GMR is used for the MR device section, current flows in a direction perpendicular to the film plane in the MR device section, thus obtaining a large magnetic resistance effect.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A thin film magnetic head comprising a recording head section and a reproducing head section, wherein the recording head section includes an upper head core section and a lower head core section and a recording gap between the upper head core section and the lower head core section, the reproducing head section includes an upper shield section functioning as the lower head core section of the recording head section, a lower shield section and a magnetoresistance device section, the magnetoresistance device section being disposed in a shield gap between the upper shield section and the lower shield section, wherein the magnetoresistance device section is electrically connected to the upper shield section and the lower shield section through conductive layers, and current can flow through the magnetoresistance device section via the upper shield section and the lower shield section;

wherein the magnetoresistance device section comprises a multilayer structure exhibiting a giant magnetoresistance effect, the multilayer structure comprising a hard magnetic film, a soft magnetic film and a non-magnetic film formed between the hard magnetic film and the soft magnetic film, and the maximization easy axis of the hard magnetic film substantially agrees with a direction of a magnetic field to be detected.

2. A thin film magnetic head according to claim 1, wherein the current flows in a direction substantially perpendicular to a plane of the multilayer structure.

3. A thin film magnetic head according to claim 1, wherein the magnetization easy axis of the soft magnetic film is substantially orthogonal to the direction of the magnetic field to be detected.

4. A thin film magnetic head according to claim 3, wherein the soft magnetic film is mainly composed of $Ni_XCo_YFe_Z$, where X is 0.6 to 0.9, Y is 0 to 0.4 and Z is 0 to 0.3 in an atomic composition ratio.

5. A thin film magnetic head according to claim 3, wherein the soft magnetic film is mainly composed of $Ni_{X'}Co_{Y'}Fe_{Z'}$, where X' is 0 to 0.4, Y' is 0.2 to 0.95 and Z' is 0 to 0.5 in an atomic composition ratio.

6. A thin film magnetic head according to claim 3, wherein the soft magnetic film is formed of an amorphous material.

7. A thin film magnetic head according to claim 1, further comprising an interface magnetic film mainly composed of Co having a thickness of about 0.1 to 1 nm located at at least one interfaces between the non-magnetic film and the hard magnetic film and between the non-magnetic film and the soft magnetic film.

8. A thin film magnetic head according to claim 7, wherein the magnetoresistance device section comprises a plurality of multilayer structures.

9. A thin film magnetic head according to claim 8, wherein the magnetoresistance device section further comprises a non-magnetic film between the plurality of multilayer structures.

10. A thin film magnetic head according to claim 1, wherein the magnetoresistance device section comprises a plurality of multilayer structures.

11. A thin film magnetic head according to claim 10, wherein the magnetoresistance device section further comprises a non-magnetic film between the plurality of multilayer structures.

12. A thin film magnetic head according to claim 1, wherein the non-magnetic film comprises a first non-magnetic film, a second non-magnetic film and a third non-magnetic film interposed between the first non-magnetic film and the second non-magnetic film, and the third non-magnetic film has a thickness of about 0.1 to 1 nm and is formed of a different material from the first non-magnetic film and the second non-magnetic film.

13. A thin film magnetic head according to claim 12, wherein the first and second non-magnetic films are formed of Cu, and the third non-magnetic film is formed of Ag.

14. A thin film magnetic head according to claim 1, wherein the non-magnetic film is formed of any one of materials selected from Cu, Ag and Au.

15. A thin film magnetic head according to claim 1, wherein the non-magnetic film is an oxide thin film.

16. A thin film magnetic head according to claim 15, wherein the oxide thin film is formed of aluminum oxide.

17. A thin film magnetic head according to claim 1, wherein the hard magnetic film is formed of a material mainly composed of Co.

18. A thin film magnetic head according to claim 1, wherein a ratio of remnant magnetization to a saturation magnetization of the hard magnetic film is about 0.7 or more.

19. A thin film magnetic head comprising a recording head section and a reproducing head section, wherein the recording head section includes an upper head core section and a lower head core section and a recording gap between the upper head core section and the lower head core section, the reproducing head section includes an upper shield section functioning as the lower head core section of the recording head section, a lower shield section and a magnetoresistance device section, the magnetoresistance device section being disposed in a shield gap between the upper shield section and the lower shield section, wherein the magnetoresistance device section is electrically connected to the upper shield section and the lower shield section through conductive layers, and current can flow through the magnetoresistance device section via the upper shield section and the lower shield section;

wherein the magnetoresistance device section comprises a multilayer structure exhibiting a giant magnetoresistance effect, the multilayer structure comprising a pair of magnetic films and a non-magnetic film interposed between the pair of magnetic films, and the pair of magnetic films are a pair of soft magnetic films coupled in an anti-ferromagnetic exchange interaction.

20. A thin film magnetic head according to claim 19, wherein the magnetoresistance device section comprises a plurality of multilayer structures.

21. A thin film magnetic head according to claim 19, wherein the non-magnetic film is formed of any one of materials selected from Cu, Ag and Au.

22. A thin film magnetic head comprising a recording head section and a reproducing head section, wherein the recording head section includes an upper head core section and a lower head core section and a recording gap between the upper head core section and the lower head core section, the reproducing head section includes an upper shield section functioning as the lower head core section of the recording head section, a lower shield section and a magnetoresistance device section, the magnetoresistance device section being disposed in a shield gap between the upper shield section and the lower shield section, wherein the magnetoresistance device section is electrically connected to the upper shield section and the lower shield section through conductive layers, and current can flow through the magnetoresistance device section via the upper shield section and the lower shield section;

wherein the magnetoresistance device section comprises a multilayer structure exhibiting a giant magnetoresistance effect, the multilayer structure comprising a metal anti-ferromagnetic film, a first magnetic film magnetically coupled to the metal anti-ferromagnetic film, a soft magnetic film and a non-magnetic film formed between the first magnetic film and the soft magnetic film in this order, and the magnetization easy axis of the first magnetic film substantially agrees with a direction of a magnetic field to be detected.

23. A thin film magnetic head according to claim 22, wherein the multilayer structure further comprises an interface magnetic film mainly composed of Co having a thickness of about 0.1 to 1 nm located at at least one of interfaces between the non-magnetic film and the first magnetic film and between the non-magnetic film and the soft magnetic film.

24. A thin film magnetic head according to claim 23, wherein the magnetoresistance device section comprises a plurality of multilayer structures.

25. A thin film magnetic head according to claim 24, wherein the magnetoresistance device section further comprises a non-magnetic film between the plurality of multilayer structures.

26. A thin film magnetic head according to claim 22, wherein the magnetoresistance device section comprises a plurality of multilayer structures.

27. A thin film magnetic head according to claim 26, wherein the magnetoresistance device section further comprises a non-magnetic film between the plurality of multilayer structures.

28. A thin film magnetic head according to claim 22, wherein the non-magnetic film comprises a first non-magnetic film, a second non-magnetic film and a third non-magnetic film interposed between the first non-magnetic film and the second non-magnetic film, and the third non-magnetic film has a thickness of about 0.1 to 1 nm and is formed of a different material from the first non-magnetic film and the second non-magnetic film.

29. A thin film magnetic head according to claim 28, wherein the first and second non-magnetic films are formed of Cu, and the third non-magnetic film is formed of Ag.

30. A thin film magnetic head according to claim 22, wherein the non-magnetic film is formed of any one of materials selected from Cu, Ag and Au.

31. A thin film magnetic head according to claim 22, wherein the non-magnetic film is an oxide thin film.

32. A thin film magnetic head according to claim 31, wherein the oxide thin film is formed of aluminum oxide.

33. A thin film magnetic head according to claim 22, wherein the metal anti-ferromagnetic film is formed of any one of materials selected from NiMn, IrMn and PtMn.

* * * * *

UNITED STATES PATENT AND TRADEMARK OFFICE
CERTIFICATE OF CORRECTION

PATENT NO. : 6,084,752
DATED : July 4, 2000
INVENTOR(S) : Sakakima et al.

It is certified that error appears in the above-identified patent and that said Letters Patent is hereby corrected as shown below:

Column 12,
Line 7, replace "the maximization easy" with -- the magnetization easy --.
Line 29, replace "one interfaces" with -- one of interfaces --.

Signed and Sealed this

Fifth Day of March, 2002

Attest:

JAMES E. ROGAN
*Director of the United States Patent and Trademark Office*

*Attesting Officer*